Aug. 22, 1961      E. O. MELMER      2,997,002
CROSS TRANSFER CONVEYOR

Filed Feb. 3, 1958      5 Sheets-Sheet 1

INVENTOR.
Eric O. Melmer
BY
Harness, Dickey & Pierce
ATTORNEYS.

INVENTOR.
Eric O. Melmer.
BY
Harness, Dickey & Pierce
ATTORNEYS.

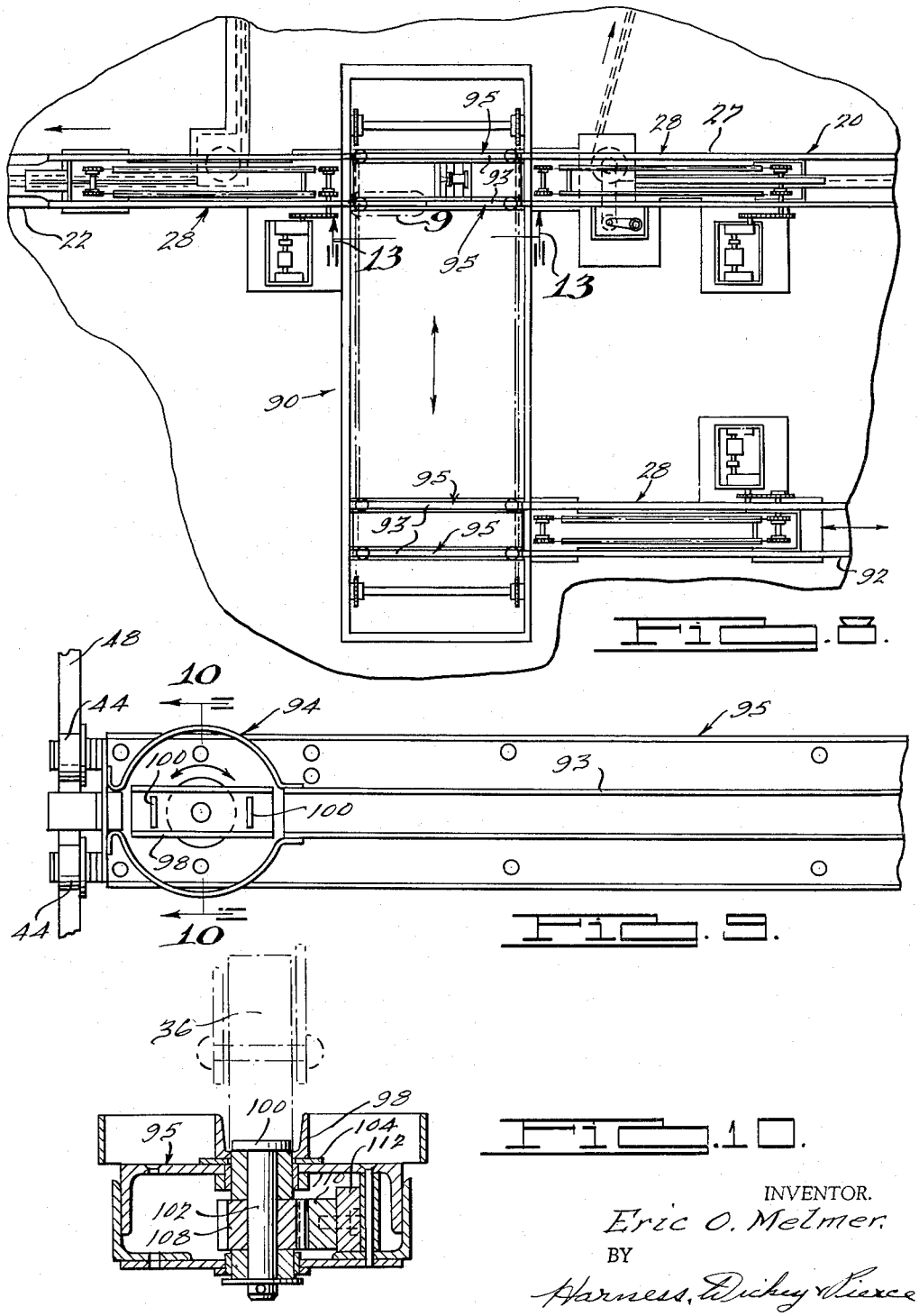

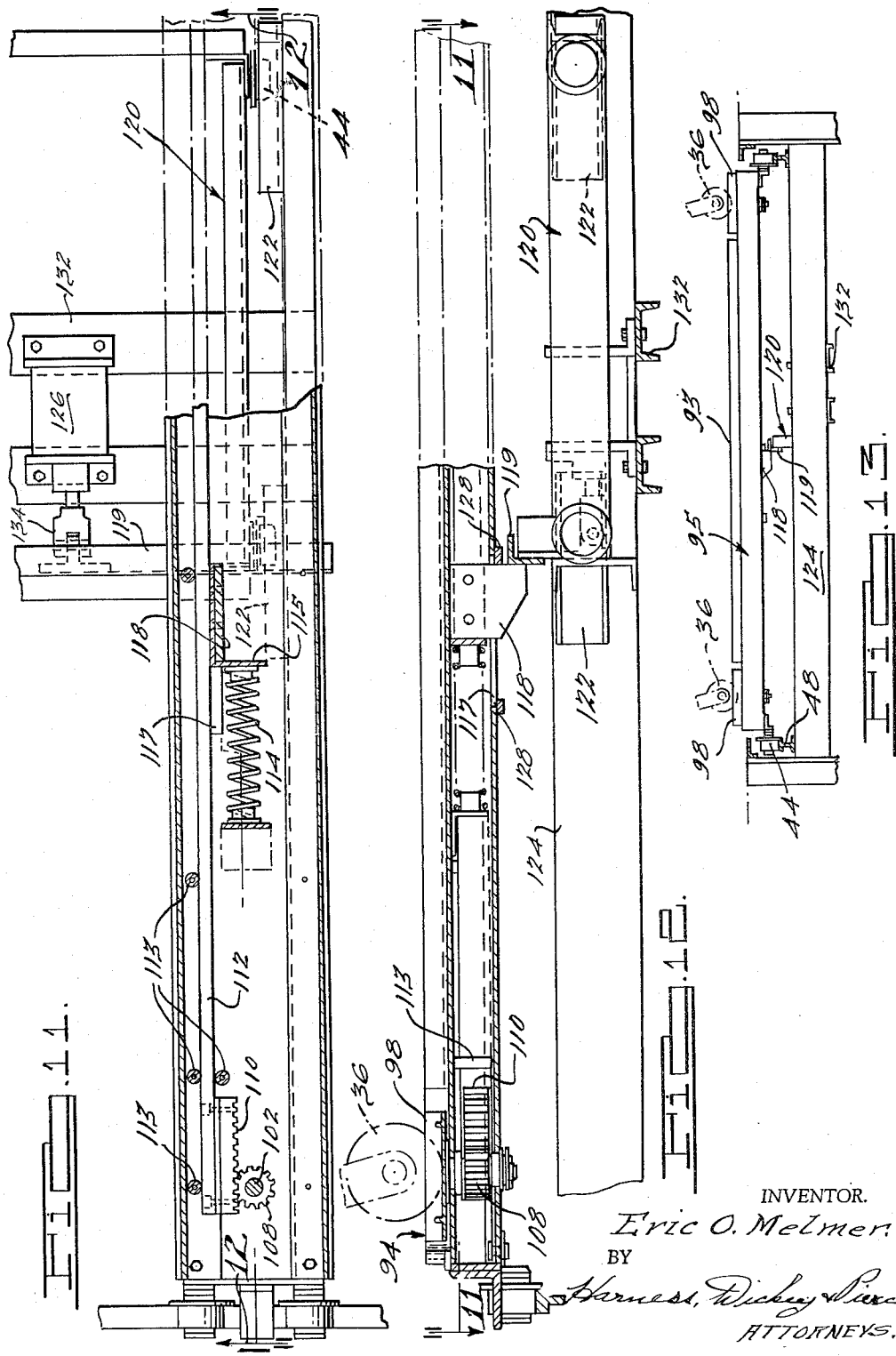

United States Patent Office 2,997,002
Patented Aug. 22, 1961

2,997,002
CROSS TRANSFER CONVEYOR
Eric Otto Melmer, Grosse Pointe Park, Mich., assignor to Palmer-Bee Company, Detroit, Mich., a corporation of Michigan
Filed Feb. 3, 1958, Ser. No. 712,917
15 Claims. (Cl. 104—50)

This invention relates to improved conveyor apparatus, and more particularly but not necessarily exclusively to improved conveyor apparatus for transferring workpieces from a first conveyor line to a second line laterally spaced therefrom.

Automatic conveyors are extensively used in the processing industries for transporting workpieces through a series of sequentially arranged work stations. It is often desirable to shift workpieces laterally from the path of a particular conveyor, such as, for example, when different workpieces are to be differently processed, or when it is necessary to rearrange the workpieces in a new order or sequence on the conveyor. The apparatus of the present invention is particularly suited for use as a cross transfer conveyor, that is, for moving workpieces laterally with respect to the line of travel of a main conveyor, or between two laterally spaced conveyors.

Accordingly, one important object of the present invention is to provide an improved cross transfer conveyor adapted to receive a workpiece from a processing conveyor, and to transfer it laterally away from the path of the conveyor. Another object is to provide an improved cross transfer conveyor for carrying workpieces between a conveyor line and a predetermined point laterally spaced therefrom, and including means for insuring accurate alignment of the workpieces with the conveyor line and with the predetermined point regardless of the direction of transfer.

In many industrial tow conveyor systems, the workpieces are loaded and transported on castered trucks, and it is sometimes desired in connection with a cross transfer operation to reverse the direction of travel of the workpieces so that, for example, when they are delivered to the cross transfer conveyor in a forward direction, they would then leave it in a reverse direction. When the work is transported on skids or fixed axle carriers, such reversal of travel offers little problem. But when the workpieces are mounted on castered trucks it is important to reverse the caster position before reverse movement of the trucks starts. Otherwise, the trucks may veer as the casters turn in response to the reverse travel, or, if the conveyor is equipped with channel tracks, or guides, the casters may become wedged therein as they attempt to turn.

Accordingly, another object of the invention is to provide improved caster reversal means for controllably reversing the orientation of truck casters. A further object is to provide cross transfer conveyor apparatus including means for reversing the orientation of casters of trucks carried by the conveyor while the trucks remain stationary on the apparatus.

The foregoing and other objects are accomplished by the present invention, a preferred embodiment of which comprises an idler chain assembly including a pair of spaced apart endless chains arranged for operation around a pair of horizontal axes. At least four sets of truck receiving members are attached to the chains for drive thereby, two sets being normally positioned along the upper reach of the chains, and two along the lower reach. The chains are driven by an auxiliary drive chain through a vertically slidable pusher bar which is mounted for selective engagement with the members on the lower reach of the idler chains. A mechanical interlock is also provided for insuring positive precise alignment of the members at the transfer terminal points.

A further feature of the invention pertains to means for reversing the caster direction of trucks carried by the conveyor, and in the embodiment shown herein such means comprise spindle-mounted channel sections carried by the truck receiving members and positioned to receive the casters of a truck when it is loaded on the conveyor. These channel sections are rotatable about vertical axes by a rack and pinion arrangement for positively reversing the caster direction.

The invention will now be described in greater detail in connection with the accompanying drawing of which:

FIG. 2 is a side elevational view of the cross transfer conveyor shown in FIG. 1, looking in the direction of the arrow 2 thereof;

FIG. 8 is a plan view of another typical transfer layout in an industrial conveyor system including a cross transfer conveyor according to a second embodiment of the invention, including means for reversing the caster direction of the trucks, so that, as indicated by the arrows, the direction of travel of the trucks may be reversed without danger of veering or of binding of the casters in the channel guides;

FIG. 9 is a fragmentary plan view on an enlarged scale of that portion of the cross transfer conveyor shown in FIG. 8 included within the circle 9 thereof;

FIG. 10 is a cross-sectional view of the cross transfer conveyor shown in FIG. 9, taken generally along the section line 10—10 thereof;

FIG. 11 is a cross-sectional view of the cross transfer conveyor shown in FIGS. 8—10, taken generally along the section line 11—11 of FIG. 12;

FIG. 12 is a cross-sectional view of the cross transfer conveyor shown in FIG. 11, taken generally along the section line 12—12 thereof; and FIG. 13 is a cross-sectional view of the cross transfer conveyor shown in FIG. 8, taken generally along the section line 13—13 thereof.

Figure 1:
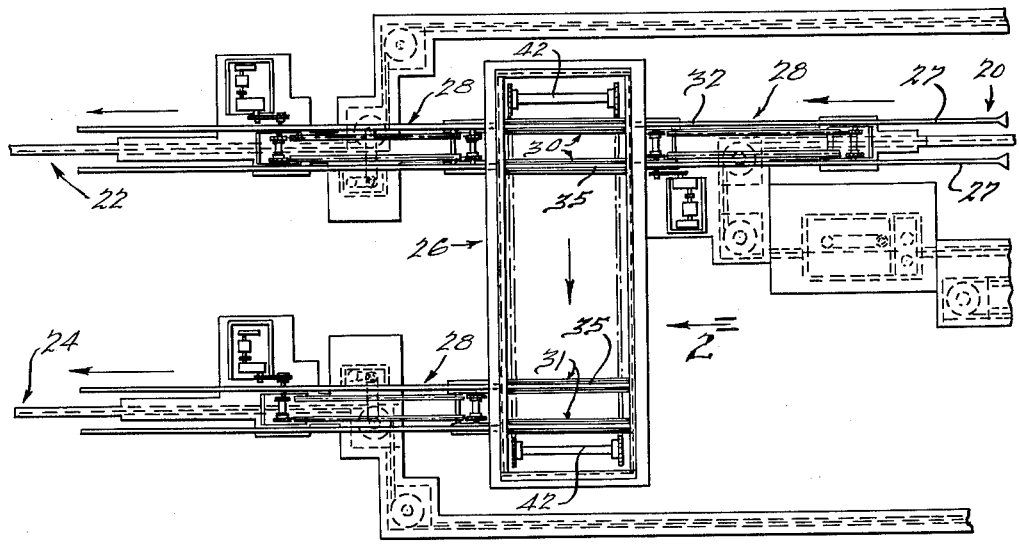
FIGURE 1 is a plan view of a typical transfer layout in an industrial conveyor system including a cross transfer conveyor according to the present invention.
Figure 3:
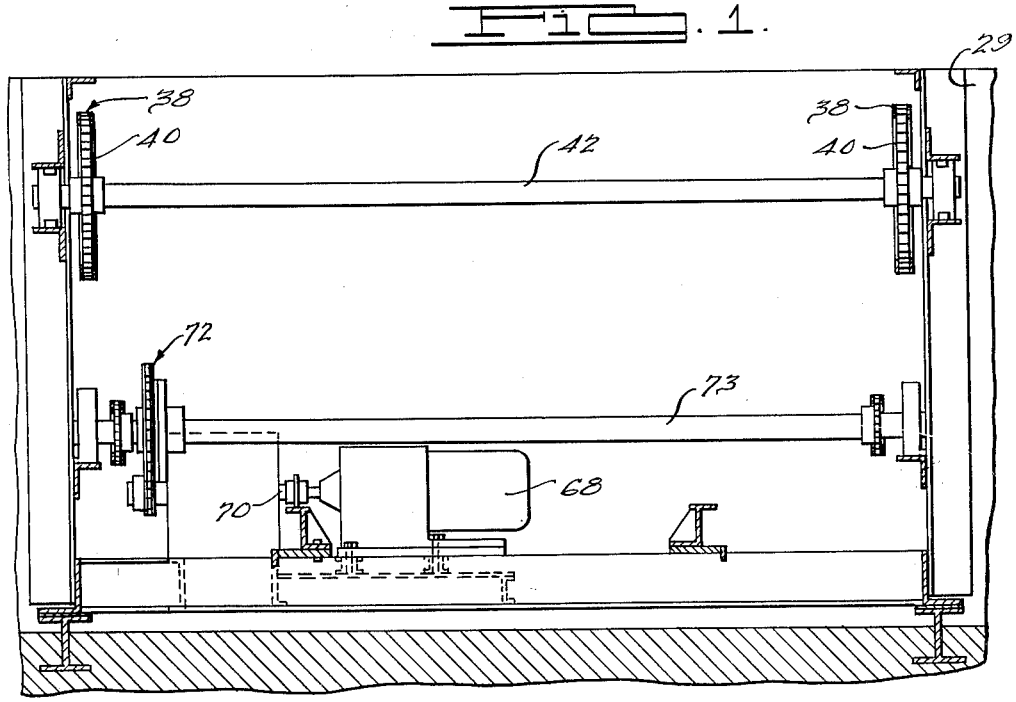
FIG. 3 is a cross-sectional view of the cross transfer conveyor shown in FIG. 2, taken generally along the section line 3—3 thereof.
Figure 4:
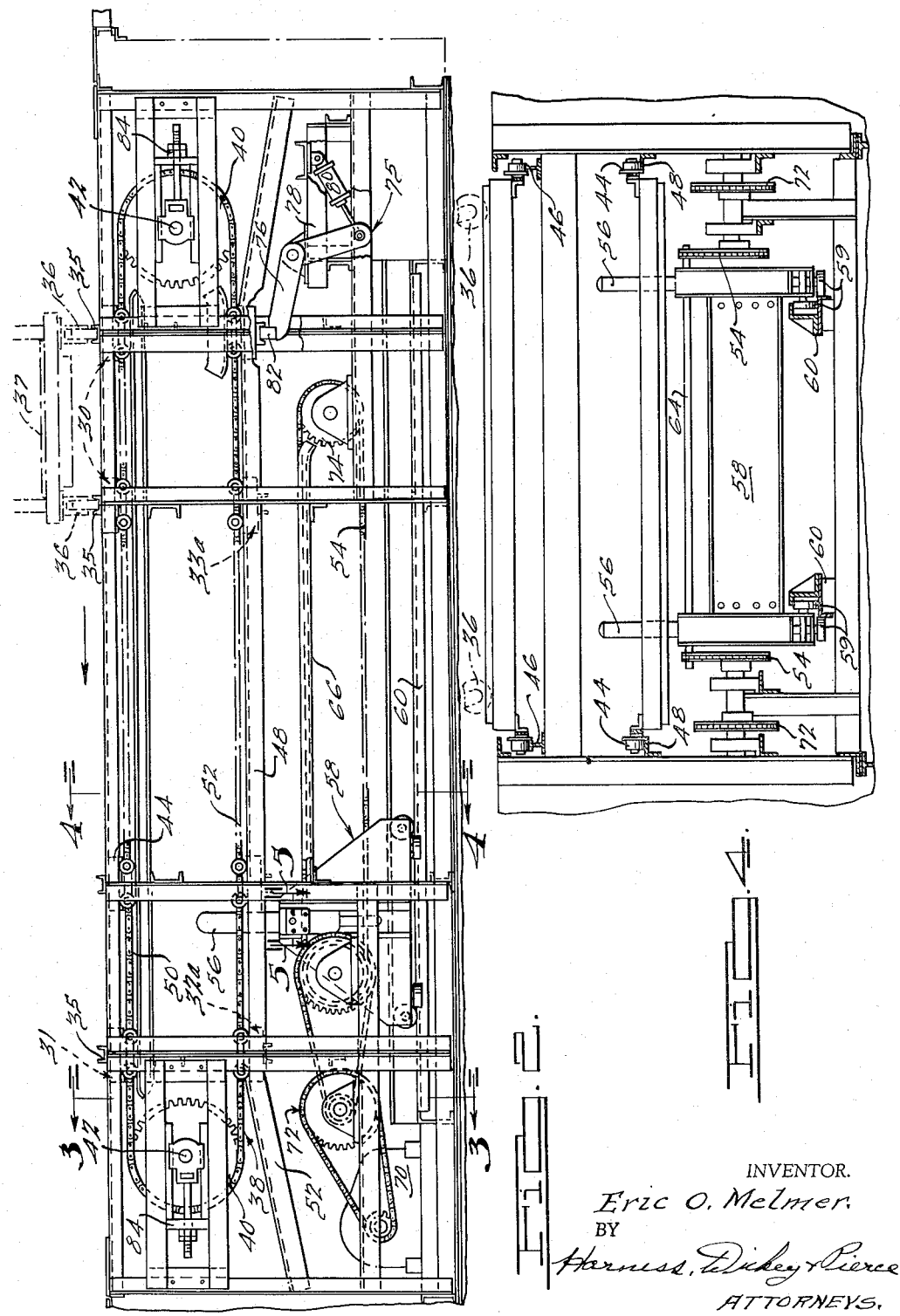
FIG. 4 is a cross-sectional view of the cross transfer conveyor shown in FIG, 2, taken generally along the section line 4—4 thereof.
Figure 5:
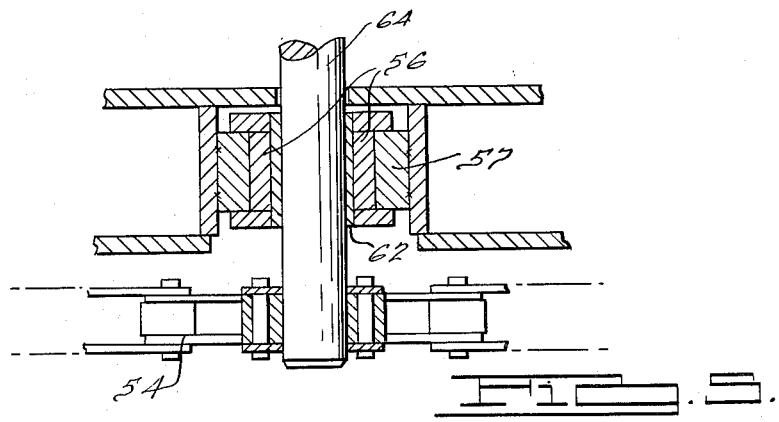
FIG. 5 is a fragmentary, horizontal sectional view showing a portion of the cross transfer conveyor shown in FIG. 2, taken generally along the section line 5—5 thereof.

A typical transfer layout in an industrial conveyor system is illustrated in FIG. 1, and includes a supply conveyor 20, two spaced apart pick-up conveyors 22 and 24 extending generally parallel to the supply conveyor, a transfer conveyor 26 according to the present invention, and three speed-up conveyors 28 for loading and unloading the transfer conveyor. The supply conveyor 20 and the first pick-up conveyor 22 may be aligned along the same general line of travel, whereas the second pick-up conveyor 24 is offset from the line of travel of the supply conveyor. The transfer conveyor 26 extends laterally between the line of travel of the supply conveyor 20 and the line of the second, or offset pick-up conveyor 24, and is operatable to transfer workpieces between the supply conveyor and the second pick-up conveyor 24.

In the layout illustrated, the workpieces are carried on trucks which normally roll along the floor, or in special guides 27, and the conveyor apparatus is arranged below the level of the floor or of the guides. The cross transfer conveyor 26 in the present embodiment is situated in a pit 29, and only the truck receiving guides 35 project above the floor.

The layout shown may be desired, for example, where different workpieces being moved by the supply conveyor 20 through common processing steps are subsequently to be processed differently. For maximum efficiency it is usually desired to process every workpiece passing through a given station at that station, and accordingly separate processing lines are often used where the processing sequence or steps are different. Parallel lines may also be required for other reasons such as, for example, where different rates of work-piece travel are required at different stations. Some of the workpieces in the present instance, after leaving the supply conveyor 20 are to be routed to the first pick-up conveyor 22, and others to the second pick-up conveyor 24. In the layout shown in FIG. 1, the cross transfer conveyor 26 is arranged to transfer workpiece holding carriages, or trucks from one line of travel laterally to another line in either direction.

In the operation of conveyor systems, it is generally desirable to space the workpieces as closely together as possible along the conveyor line, and in order to allow time for the transfer conveyor 26 to move the workpieces laterally at a reasonable speed without interfering with the steady progress of the supply conveyor 20, it may be necessary to employ speed-up conveyors 28, preferably of the type disclosed and claimed in my copending application, Serial No. 698,725, filed November 25, 1957 and entitled, "Speed-Up Conveyor" (now abandoned). These speed-up conveyors 28 extend from the loading nad unloading points of the cross transfer conveyor and operate at a relatively high speed in order to increase the spacing between the trucks at the transfer points, and to provide time for the cross transfer conveyor 26 to transfer the trucks without interfering with the smooth operation of the supply conveyor 20 or of the two pick-up conveyors 22 and 24. The construction of the speed-up conveyors 28 will not be described in detail herein, since they are fully described in the hereinabove referred to copending application, and form no part of the present invention, which is concerned primarily with the cross transfer conveyor 26, the construction of which will now be described in greater detail.

The cross transfer conveyor 26 is operated selectively to transfer selected ones of the trucks from the supply conveyor 20 to the auxiliary pick-up conveyor 24. When the cross transfer conveyor 26 is not operated, it forms merely a part of the main line connecting the supply conveyor 20 and the first pick-up conveyor 22, and serves to guide the trucks therebetween without any lateral movement. Thus, at the option of the operator, or as controlled by an automatic control system, different workpieces may be selectively moved from the supply conveyor 20 either to the first pick-up conveyor 22 or to the second pick-up conveyor 24, as desired, depending upon whether or not the cross transfer conveyor is actuated. In the layout illustrated in FIG. 1, the workpiece carrying trucks always move from right to left as viewed in that figure, and it is not contemplated that their direction of travel will be reversed. If the travel of the trucks is to be reversed, then the cross transfer conveyor 26 is modified according to the embodiment of the invention to be described hereinafter in connection with FIGS. 8–13.

It should also be pointed out that during their lateral movement on the cross transfer conveyor, the trucks do not roll on their casters, but are simply carried, their casters remaining stationary. The trucks of the conveyor ysstem are pushed upon the cross transfer conveyor by any convenient means such as the speed-up conveyor 28, and the cross transfer conveyor 26 does not inclde means for moving the trucks fore and aft.

To keep the trucks in proper alignment, guide channels 27 are provided leading up to the cross transfer conveyor to guide the truck casters and to lead them into the channels 35 of the cross transfer conveyor. These channels 35 are mounted on supporting members 30, 31, 32a, 32b, 33a, and 33b, called slats, and are movable therewith laterally between the two transfer points, that is, into alignment either with the auxiliary pick-up conveyor 24, or with the supply conveyor 20. The operation of the cross transfer conveyor 26 is concerned primarily with the travel of the slats 30, 31, 32a, 32b, 33a and 33b and their movement between two predetermined positions along the length of the cross transfer conveyor itself, that is, from top to bottom, and from bottom to top as viewed in FIG. 1, or from left to right as viewed in FIG. 2.

Referring now to FIGS. 2–7, and particularly to FIG. 2, the slats 30 to 33b are arranged in pairs, the two slats of each pair being spaced apart to receive the opposed wheels 36 of a conveyor truck 37, and being sufficiently long to accommodate all four wheels of such a truck. The sltas are individually attached to a pair of idler chains 38 arranged along opposite sides of the conveyor, the separate pairs being spaced along the chains at equal intervals. The chains 38 are trained around idler sprockets 40, which are fixed on shafts 42 journaled at opposite ends of the conveyor. This arrangement assures positive synchronization of the two chains 38 with each other, and keeps the slats properly aligned. The slats 30 to 33b are secured at both ends to load-bearing rollers 44, which are pivoted on the idler chains 38, and which roll on supporting rails 46 and 48 along the upper and lower reaches 50 and 52, respectively, of the idler chains 38. The slats are thus drivable by the chains 38, traveling along the upper reach 50, around the sprockets 40 at one end of the converyor to the lower reach 52, then along the lower reach 52, and over the sprockets 40 at the opposite end, back to the upper reach 50.

The idler chains 38 are driven by a pair of vertical pusher bars 56, mounted on a carriage 58 beneath the lower reach 52, and secured to a pair of endless drive chains 54 for both vertical and horizontal reciprocation thereby. The carriage 58 is mounted on rollers 59 for smoothly guided travel back and forth along a pair of rails 60 fixed near the bottom of the apparatus. The pusher bars 56 are vertically slidable in ways 57 on the carriage 58, and are connected to the drive chains 54 by a common shaft 64, which is journaled in bearings 62 carried by the pusher bars 56, and which is fixed at both ends to the drive chains 54. The pusher bars 56 strike and push against one of the slats 30, 31, 32a, 32b, 33a, or 33b on the lower reach 52 of the idler chains when the bars 56 are in their raised, or extended positions, and pass beneath the slats when they are in their lowered, or retracted positions.

Guide tracks 66 are provided along the upper reach of the drive chains 54 for supporting the weight of the chains and also the weight of the pusher bars 56, which are connected to the chains through the shaft 64. No guide and supporting channels are required along the lower reach of the chains 54, since when the bars 56 are at their lower positions they do not rest upon the chains but are supported by stops (not shown) on the carriage 58. The drive chains 54 are driven by a motor 68 (FIG. 3) through a gear reduction assembly 70 and a double-sprocket drive generally designated 72. This drive 72 is arranged to drive the two chains 54 synchronously, avoiding the application of any twisting or binding forces upon the carriage 58. In the embodiment shown, synchronous drive is accomplished by driving both chains 54 through a single shaft 73. Preferably, means are also provided for selectively reversing the direction of drive of the chains 54, either electrically by reversing the direction of rotation of the motor 68, or mechanically by reversing gears (not separately shown) which may be included in the gear assembly 70.

The pusher bars 56 travel with the drive chains 54, and are raised and lowered as the shaft 64 is carried around the sprockets 74 over which the chains are trained. The spacing, lengthwise, between these sprockets 74 is critical in the practice of the invention, and must be closely related to the spacing between the transfer points of the conveyor system. The spacing of the drive chain sprockets 74 determines the length of travel of the pusher bars 56, and thereby the cross transfer distance.

The pusher bars 56 are raised sufficiently high to engage the slats on the lower reach 52 of the idler chains whenever the shafts 64 is level with or higher than the centers of the sprockets 74. With this arrangement, the pusher bars 56 always drive the slats to the full limit of the pusher bar horizontal travel, and are not disengaged while they are under way in the driving direction.

Figure 6:
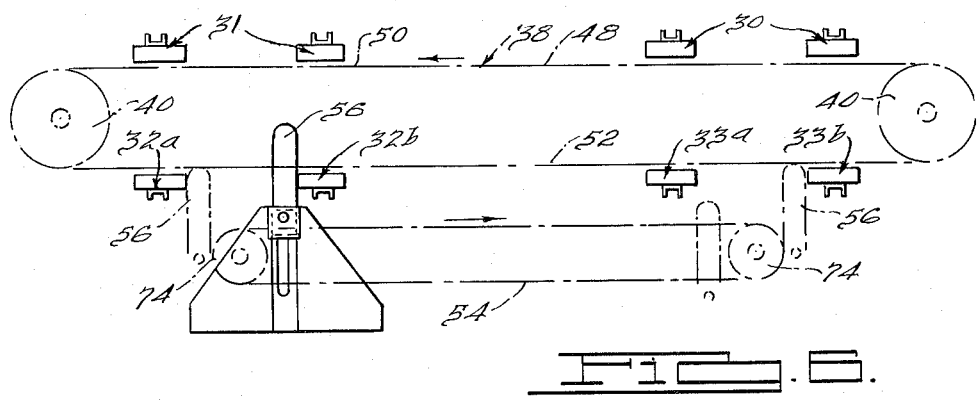
FIG. 6 is a diagrammatic side elevational view of the cross transfer conveyor as shown in FIG. 2, particularly illustrating the basic structure and operation thereof, and showing the conveyor in one operative position.
Figure 7:
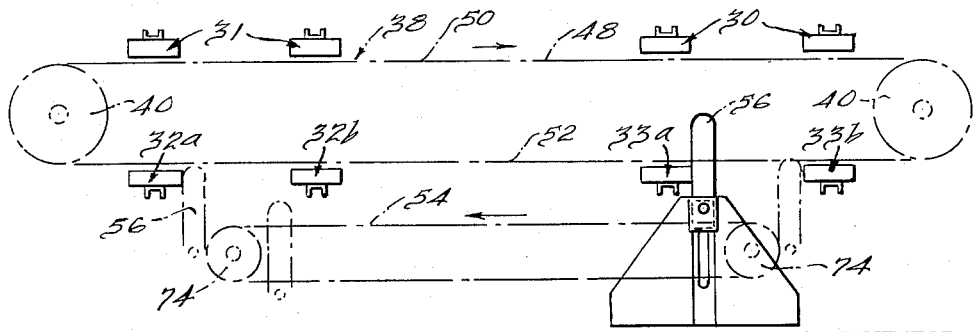
FIG. 7 is a diagrammatic side elevational view of the cross transfer illustrated in FIG. 2, this view being generally similar to the view of FIG. 6, but showing the conveyor in a second operative position.

Referring now to FIGS. 6 and 7, it will be seen that when the drive chains 54 are driven in a clockwise direction as viewed in those figures, the pusher bars 56 travel to the right when they are in their raised position, and return toward the left in their lowered position, driving the idler chains 38 intermittently in a counterclockwise direction. The drive chain sprockets 74 are spaced so that after the pusher bars 56 have driven and been lowered from the right-hand slat 33b, and have returned along the lower reach of the drive chains 54, they will be raised at a point just clearing the extreme left-hand slat 32a. The arrangement is symmetrical, and the operation is the same regardless of the direction of drive. As the pusher bars 56 are raised, they just clear the outermost one of the slats and move on to engage the next slat (in FIG. 6 this is the slat 32b, and in FIG. 7, the slat 33a). The engaged slat is then driven by the pusher bars 56 into the outermost position at the opposite end of the conveyor and released. The travel of the slats is substantially equal to the interval between the successive pairs of the slats, taken on centers, so that the right-hand upper slats 30, for example, are driven to the position initially occupied by the left-hand slats 31.

The over-all span of the drive chains 54 thus determines the length of travel of the idler chain 38 effected by a single rotation of the drive chains 54, and this length of travel is, of course, made just equal to the cross transfer distance between the supply conveyor 20 and the second pick-up conveyor 24. Proper alignment of the slats with the speed-up conveyors 28 is insured by adjustment of the take-ups 84 (FIG. 2) which control the longitudinal positioning of the idler sprockets 40. This adjustment changes the position of the upper reach 50 of the idler chains relative to the lower reach 52, and so permits adjustment of the stopping positions of the upper reach slats 30 and 31 without affecting the arrangement of the drive chains 54.

After the pusher bars 56 are lowered from engagement with the slats 30 to 33b, the idler chains 38 normally continue to coast a small distance, and an auxiliary stop 75 is provided for stopping the chains 38 when the slats on the upper reach are precisely aligned with the loading and unloading conveyors. This stop 75 comprises a bell crank 76 pivoted upon a fixed support 78 and actuatable by a clevis-mounted pneumatic or hydraulic cylinder 80. At its free end, the bell crank 76 carries an upwardly facing bar 82 which works against one of the slats 30 to 33b for positively stopping the idler chains 38 when the pneumatic cylinder 80 is extended. When the cylinder 80 is retracted, the stop bar 82 is withdrawn, permitting the idler chains to travel once again. The stop bar 82 may, as illustrated in FIG. 2, fit within one of the channels 35, or, alternatively, it may work against the sides of the slats.

According to a further feature of the invention, as illustrated in FIGS. 8–13, the cross transfer conveyor may be provided with means for reversing the caster direction of castered trucks. A second typical transfer layout in an industrial conveyor system is illustrated in FIG. 8. In this layout, workpieces are transported on castered trucks from the supply conveyor 20 over a speed-up conveyor 28 and onto the cross transfer conveyor 90. Some of the trucks merely pass over the cross transfer conveyor 90 and continue along the same line and in the same direction to the first pick-up conveyor 22. Others of the workpiece-carrying trucks coming from the supply conveyor 20 are transferred laterally by the cross transfer conveyor 90 to the second pick-up conveyor 92, which is on the same side of the cross transfer conveyor as the supply conveyor 20. In this situation, the trucks are unloaded from the cross transfer conveyor in the reverse direction from the direction in which they were loaded, and it is important to reverse the caster orientation while the trucks are on the cross transfer conveyor and before they are unloaded. When the trucks come from the supply conveyor 20, they are traveling from right to left, as viewed in FIG. 8, and their casters are properly oriented for travel in this direction without binding in the guide channels 27 or causing veering of the trucks. Trucks which have been moved by the cross transfer conveyor 90 to the second pick-up conveyor 92 leave the cross transfer conveyor traveling in the opposite direction, that is, from left to right.

The cross transfer conveyor 90, illustrated in FIGS. 8–13, includes means for reversing the orientation of the truck casters while the trucks are on it. In all other respects, this conveyor 90 is identical to the cross transfer conveyor 26 hereinabove described, and shown in FIGS. 1–7.

Individual turntable assemblies 94 are mounted on the slats 95 of the conveyor at the ends of the caster guide channels 93 for receiving the casters 36 of the trucks 37. The turntables 94 are spaced according to the wheel base and track dimensions of the trucks so that when a truck is loaded on the conveyor all four of its casters 36 rest on separate ones of the turntables.

Each one of the turntable assemblies 94 includes a small channel portion 98 which is normally aligned with the channel 93, and which constitutes a small portion of the track for guiding the casters 36. The webs of these channel portions 98 are provided with detent means such as the pair of upstanding transverse ribs 100 illustrated for centering the casters 36 and holding them in position while the trucks are on the cross transfer conveyor.

Each one of the channel portions 98 is fixed on the upper end of a vertical spindle 102, and rests upon a bearing plate 104 supported on the slat 95. A pinion 108 is fixed upon the spindle 102 and meshes with a rack 110 carried by a tie rod 112, which extends along the length of the slot 95. One rack 110 is mounted at each end of the tie rod 112 for engagement with the pinion 108 of the turntable assembly at each end of the channel 93. Appropriate guides, such as the rollers 113 shown, are mounted on the slats to hold the racks 110 in mesh with the pinions 108 and to guide the tie rods 112.

Each one of the tie rods 112 carries a bracket 115 for engagement with a biasing spring 114, which urges the tie rod toward one limit of its travel, to the right as viewed in FIGS. 11 and 12. Drive plates, or dogs 118 are secured to the brackets 115, and extend downwardly through slots 117 in the floor of the slats for engagement by a pusher bar 119. Limit stops 128 are fixed on the slats for engagement by the dogs 118 to limit the tie rod travel in both directions so that the channel portions 98 are aligned with the channel 93 when the tie rods are at either limit of their travel.

The pusher bar 119 is fixed on a carriage 120, which is roller mounted below the slots 95 on fixed guides 122 for limited reciprocating travel across the width of the conveyor. The guides 122 are mounted on supporting beams 124, which are independently fixed adjacent to one of the loading and unloading points. The carriage 120 does not travel laterally with the slats 95, but remains always at one of the normal loading or unloading points. The carriage 120 is drivable by a pneumatic cylinder 126, the base of which is fixed with respect to the beams 124, and the movable portion of which is connected to the carriage. The cylinder 126 is energizable only in one direction, and the springs 114 are effective to return it to its retracted position when it is de-energized such as by valving to atmosphere.

In operation of the illustrated embodiment, the springs 114 normally provide the energy for reversing the truck casters 36, and are pre-stressed by the cylinder 126 prior to loading of the trucks 37 on the conveyor 90. When it is desired to reverse the casters of a particular truck, the cylinder 126 is energized before the truck is loaded on the conveyor and is then de-energized after the truck casters 36 come to rest in the channel portions 98, preferably before the cross travel begins in order to avoid scraping the dogs 118 along the pusher bar 119. The springs 114 then drive the tie rods 112 back to their normal positions, rotating the turntable channel portions 98 180°, and thereby reversing the casters 36.

In the event the pusher bar 119 is disposed at the opposite end of the conveyor, that is, at the auxiliary conveyor line 92, the operating sequence will, of course, be reversed, but such variations are well within the skill of those versed in the conveyor art, and need not be described in detail herein.

The caster reversing arrangement does not interfere in any way with the lateral transport mechanism of the apparatus. The arrangement is simple in construction, accurate and positive in operation, and also highly efficient, since only one drive motor (the cylinder 126) is needed regardless of how many slats are mounted on the conveyor. In addition, it readily lends itself to automatic control by mechanical trip levers or electrical limit switches.

What is claimed is:

1. Conveyor apparatus comprising an endless chain, a plurality of workpiece transporting members connected to said chain at substantially equal intervals therealong for travel therewith, some of said members being arranged along one reach of said chain, other ones of said members being arranged along another reach of said chain, and means for driving said chain intermittently through one of said intervals by pushing one of said members a distance equal to said interval along one reach of said chain.

2. Conveyor apparatus comprising an endless chain, a plurality of workpiece transporting members connected to said chain at equal intervals therealong for travel therewith, the members along one reach of said chain being in an operative position to receive workpieces, the members along a second reach of said chain being in an inoperative position, and means for driving said chain intermittently through one of said equal intervals through engagement with one of said members along said second reach of said chain.

3. Conveyor apparatus comprising an endless chain, a plurality of workpiece transporting members connected to said chain at intervals therealong for travel therewith, the members along one reach of said chain being in an operative position to receive workpieces, the members along a second reach of said chain being in an inoperative position, and means for driving said chain, said means including a pusher bar mounted adjacent to said second reach for both longitudinal and transverse reciprocation relative thereto, and means for moving said pusher bar bodily transversely of said chain and into driving engagement with one of said members along said second reach thereby to drive said chain.

4. A cross transfer conveyor comprising a pair of endless chains mounted for synchronous travel along spaced apart parallel oval paths between a pair of transfer stations, a plurality of workpiece receiving members connected to said chains at equal intervals therealong for travel therewith between said stations, said receiving members being in an operative position when they are along one reach of said oval paths and being in an inoperative position when they are along the opposite reach, and continuously driven pusher means mounted for reciprocation transversely of said chains for engagement with selected ones of said members along said opposite reach at a predetermined position in the travel of said chains and out of engagement with said members at another predetermined position in the travel of said chains for intermittently advancing said chains through one of said intervals.

5. A cross transfer conveyor comprising a pair of endless chains arranged for synchronous travel in spaced apart vertical planes along generally parallel oval paths between two transfer stations, a plurality of work supporting guides connected to said chains at intervals therealong for travel therewith, each one of said guides including a pair of spaced apart slats separately connected to said chains, and continuously driven (periodically engageable with a selected one of said slats along the lower reach of said chains to advance said chains intermittently and to drive the guides along the upper reach of said chains between said transfer stations.

6. A cross transfer conveyor comprising a pair of endless chains arranged for synchronous travel in spaced apart vertical planes along generally parallel oval paths between two transfer stations, a plurality of work supporting guides connected to said chains at intervals therealong for travel therewith, each one of said guides including a pair of spaced apart slats separately attached to said chains, and continuously driven pusher means for intermittently pushing selected ones of said slats along the lower reach of said chains to advance said chains and to drive the guides along the upper reach of said chains, said pusher means including a pair of parallel endless drive chains arranged below said first-mentioned chains and having upper and lower reaches, a pusher bar mounted for both vertical and longitudinal reciprocation relative to said first-mentioned chains and connected to said drive chains for longitudinal and vertical drive thereby, said pusher bar being entirely below the slats along the lower reach of said first-mentioned chain when said pusher bar is driven along the lower reach of said drive chains and being positioned to drivingly engage said lower reach slats when it is driven along the upper reach of said drive chains.

7. A cross transfer conveyor comprising a pair of endless chains arranged for synchronous travel in spaced apart vertical planes along generally parallel oval paths between two transfer stations, a plurality of work supporting guides connected to said chains at equal intervals therealong for travel therewith, each one of said guides including a pair of spaced apart slats separately attached to said chains, and continuously driven pusher means for intermittently pushing selected ones of said slats along the lower reach of said chains through one of said intervals to advance said chains and to drive the guides along the upper reach of said chains, said pusher means including a pair of parallel endless drive chains arranged below said first-mentioned chains and having upper and lower reaches, a pusher bar mounted for both vertical and longitudinal reciprocation relative to said first-mentioned chains and connected to said drive chains for longitudinal and vertical drive thereby, said pusher bar being entirely below the slats along the lower reach of said first-mentioned chain when said pusher bar is driven along the lower reach of said drive chains and being positioned to drivingly engage said slats when it is driven along the upper reach of said drive chains, said drive chains being arranged and having a span such that said pusher bar advances said guides through one of said intervals during each traverse of said pusher bar along the upper reach of said drive chains.

8. A cross transfer conveyor comprising a pair of endless chains arranged for synchronous travel in spaced apart vertical planes along generally parallel oval paths between two transfer stations, a plurality of work supporting guides connected to said chains at equal intervals therealong for travel therewith, each one of said guides including a pair of spaced apart slats separately connected to said chains, and continuously driven pusher means for intermittently pushing selected ones of said slats along the lower reach of said chains through one of said intervals to advance said chains and to drive the guides along the upper reach of said chains, said pusher means including a pair of parallel endless drive chains arranged below said first-mentioned chains and having upper and lower reaches, a pusher bar mounted for both vertical and longitudinal reciprocation relative to said first-mentioned chains and connected to said drive chains for longitudinal and vertical drive thereby, said pusher bar being entirely below the slats along the lower reach of said first-mentioned chain when said pusher bar is driven along the lower reach of said drive chains and being positioned to drivingly engage said slats when it is driven along the upper reach of said drive chains, said drive chains being arranged and having a span such that said pusher bar advances said guides through one of said intervals during each traverse of said pusher bar along the upper reach of said drive chains regardless of the direction of drive.

9. Caster reversing apparatus for use in a conveyor system of the type in which castered trucks are moved along a predetermined path comprising a first channel-like member positioned to receive a first caster of said truck, a second channel-like member positioned to receive a second caster of said truck, said first and second members being spaced apart a distance equal to the distance between the first and second casters so that the first and second casters may be simultaneously received in said members, means for mounting said members for rotation about vertical axes, a pair of pinions fixed separately to said members, a pair of racks separately meshing with said pinions and mounted for linear reciprocating travel with respect thereto, a tie rod rigidly connected to said racks for synchronizing the travel thereof, and means for driving said tie rod linearly thereby to drive said racks and pinions to rotate said members through a predetermined angle.

10. Caster reversing apparatus for use in a cross transfer conveyor of the type having caster guide and support members which are movable laterally with respect to the caster direction of trucks loaded thereon for carrying the trucks between two laterally spaced paths along which the trucks are caused to roll, said apparatus comprising a plurality of channel elements pivotally mounted on said members in positions to receive the casters of a truck loaded thereon, means for urging said elements into one angular position in longitudinal alignment with said guide members, and drive means located at one of said paths for reversing the alignment of said elements against the urging of said urging means.

11. Caster reversing apparatus for use in a cross transfer conveyor of the type having caster guide and support members which are movable laterally with respect to the caster direction of trucks loaded thereon for carrying the trucks between two laterally spaced paths along which the trucks are caused to roll, said apparatus comprising a plurality of channel-like elements pivoted for horizontal rotation adjacent to the ends of each one of the members and for lateral travel therewith, rack and pinion means for rotating said elements, means for synchronizing the rotation of each pair of said elements at opposite ends of each one of the members, and drive means fixed in position at one of the laterally spaced paths for rotating said elements through actuation of said rack and pinion means, said drive means being arranged to simultaneously rotate the elements associated with two adjacent ones of the members.

12. Caster reversing apparatus for use in a cross transfer conveyor of the type having caster guide and support members which are movable laterally with respect to the caster direction of trucks loaded thereon for carrying the trucks between two laterally spaced paths along which the trucks are caused to roll, the members being supported independently of each other and arranged in pairs, the individual members of each pair being spaced apart a distance equal to the track of the trucks to be transported and being shorter than the wheel base of the trucks, said apparatus comprising a plurality of channel-like elements mounted for horizontal rotation adjacent to the ends of the support members and for lateral travel therewith, said elements being shaped to receive the casters of the trucks and being spaced apart a distance equal to the wheel base thereof, pinions connected to and rotatable with said elements, racks meshing with said pinions and reciprocatable within limits lengthwise of the members for rotating said elements, tie rods rigidly connected to both of the racks associated with each one of the members for synchronizing the rotation of the two elements at the opposite ends thereof, springs arranged for urging said tie rods toward one limit of their travel, dogs fixed upon said tie rods and depending therefrom, a laterally fixed pusher bar mounted beneath the members in a position to engage the dogs associated with one pair of said members, and means for driving said pusher bar to drive said tie rods against the urging of said springs thereby to reverse the angular positions of the elements associated with said one pair of members, said pusher bar being operative to engage all of said dogs in successive pairs as the members are successively moved into position over said pusher bar.

13. A cross transfer conveyor comprising a plurality of pairs of slats secured at intervals to an endless chain for travel around an oval path, means for intermittently driving said chain, caster reversing devices mounted on said slats for reversing the caster direction of trucks loaded thereon, and means for actuating said devices, said actuating means being fixed against travel along said path and including an abutment member movable laterally of said path and engageable with the said reversing devices of said slats that are at said predetermined position when said actuating means are energized.

14. In a conveyor apparatus, a carriage mounted for reciprocating travel along a predetermined path, a pusher bar mounted on said carriage for limited movement transversely of said path of travel, an endless chain disposed adjacent to said carriage for travel in a generally oval path coextensive with said predetermined path, means for driving said chain continuously, connecting means fastening said pusher bar to said chain for back-and-forth movement thereby both along said predetermined path and transversely thereto, said pusher bar being engageable with and operative to drive a preselected portion of said apparatus by operation of said chain driving means when said bar is in one transverse position relative to said predetermined path and being free to travel along said path independently of said portion when it is in another transverse position relative to said predetermined path.

15. In a conveyor apparatus, caster reversing means for reversing the caster direction of a castered vehicle comprising a channel member for each caster of the vehicle to be reversed by said caster reversing means, each such channel member being mounted for rotation about a vertical axis and positioned to receive and support a caster of the vehicle and to hold the caster against horizontal rotation relative to said member, and means for rotating each said channel member about said vertical axis thereby to change the caster direction of the caster supported by said member.

References Cited in the file of this patent

UNITED STATES PATENTS

| | | |
|---|---|---|
| 487,717 | Clarke | Dec. 13, 1892 |
| 607,146 | Turner | July 12, 1898 |
| 1,099,951 | Thurston | June 16, 1914 |
| 1,188,887 | Bower | June 27, 1916 |
| 1,322,456 | King | Nov. 18, 1919 |
| 1,323,902 | Obolewicz | Dec. 2, 1919 |
| 1,431,248 | Norris | Oct. 10, 1922 |
| 1,523,154 | Yuskewicz | Jan. 13, 1925 |
| 1,550,754 | Sockman | Aug. 25, 1925 |
| 1,706,211 | Coffey | Mar. 19, 1929 |
| 1,819,017 | Drake | Aug. 18, 1931 |
| 1,896,151 | Yademach | Feb. 7, 1933 |
| 1,960,719 | Stibbs | May 29, 1934 |
| 2,019,949 | Brace | Nov. 5, 1935 |
| 2,583,278 | Rosenblatt et al. | Jan. 22, 1952 |
| 2,586,264 | Rose | Feb. 19, 1952 |
| 2,728,238 | Paasche | Dec. 27, 1955 |

FOREIGN PATENTS

| | | |
|---|---|---|
| 276,190 | Germany | Sept. 17, 1913 |
| 288,473 | Great Britain | Apr. 19, 1928 |

UNITED STATES PATENT OFFICE
CERTIFICATE OF CORRECTION

Patent No. 2,997,002                                              August 22, 1961

Eric Otto Melmer

It is hereby certified that error appears in the above numbered patent requiring correction and that the said Letters Patent should read as corrected below.

Column 3, line 41, for "nad" read -- and --; column 4, line 30, for "sltas" read -- slats --; column 6, line 64, for "slot" read -- slat --; column 7, line 8, for "slots" read -- slats --; column 8, line 33, after "driven" insert -- pusher means --; same line 33, strike out the opening parenthesis; column 10, line 54, strike out "the".

Signed and sealed this 13th day of February 1962.

(SEAL)
Attest:

ERNEST W. SWIDER                                       DAVID L. LADD
Attesting Officer                                          Commissioner of Patents